United States Patent
Ikeda et al.

(10) Patent No.: US 8,400,755 B2
(45) Date of Patent: Mar. 19, 2013

(54) DIELECTRIC CERAMIC COMPOSITION AND MONOLITHIC CERAMIC CAPACITOR

(75) Inventors: Jun Ikeda, Nagaokakyo (JP); Shoichiro Suzuki, Nagaokakyo (JP)

(73) Assignee: Murata Manufacturing Co., Ltd., Nagaokakyo-Shi, Kyoto-fu (JP)

( * ) Notice: Subject to any disclaimer, the term of this patent is extended or adjusted under 35 U.S.C. 154(b) by 55 days.

(21) Appl. No.: 13/069,502

(22) Filed: Mar. 23, 2011

(65) Prior Publication Data

US 2011/0170228 A1 Jul. 14, 2011

Related U.S. Application Data

(63) Continuation of application No. PCT/JP2009/066089, filed on Sep. 15, 2009.

(30) Foreign Application Priority Data

Sep. 24, 2008 (JP) .................................. 2008-243613

(51) Int. Cl.
*H01G 4/06* (2006.01)
*C04B 35/00* (2006.01)

(52) U.S. Cl. .................... 361/321.4; 361/321.5; 501/137
(58) Field of Classification Search .... 361/321.1–321.5; 501/134–136
See application file for complete search history.

(56) References Cited

U.S. PATENT DOCUMENTS

| | | | |
|---|---|---|---|
| 6,226,172 B1 | 5/2001 | Sato et al. | |
| 6,800,270 B2 | 10/2004 | Nomura et al. | |
| 7,273,828 B1 * | 9/2007 | Boldingh et al. | 502/216 |
| 7,821,770 B2 | 10/2010 | Nishikawa et al. | |
| 8,059,388 B2 * | 11/2011 | Yamazaki et al. | 361/321.4 |
| 2002/0041061 A1 | 4/2002 | Nomura et al. | |
| 2002/0074154 A1 * | 6/2002 | Kim et al. | 174/137 B |
| 2004/0038800 A1 * | 2/2004 | Horie et al. | 501/139 |
| 2006/0139845 A1 | 6/2006 | Hiramatsu et al. | |
| 2007/0142210 A1 * | 6/2007 | Muto et al. | 501/138 |
| 2008/0089008 A1 | 4/2008 | Nishikawa et al. | |

FOREIGN PATENT DOCUMENTS

| | | |
|---|---|---|
| CN | 1832905 A | 9/2006 |
| JP | 2000154057 A | 6/2000 |
| JP | 2000311828 A | 11/2000 |
| JP | 2002060268 A | 2/2002 |
| JP | 2005194138 A | 7/2005 |
| JP | 2008094673 A | 4/2008 |

OTHER PUBLICATIONS

Translation JP2005194138A.*
Written Opinion of the Internatoinal Searching Authority, mailed Oct. 27, 2009.

* cited by examiner

*Primary Examiner* — Eric Thomas
(74) *Attorney, Agent, or Firm* — Dickstein Shapiro LLP

(57) ABSTRACT

There is provided a dielectric ceramic composition suitable for, for example, a car-mounted monolithic ceramic capacitor used in a high-temperature environment. It is represented by the composition formula: $100(Ba_{1-x}Ca_x)_m TiO_3 + aMgO + bV_2O_5 + cSiO_2 + dR_2O_3$ wherein R represents at least one metal element selected from Y, La, Sm, Eu, Gd, Tb, Dy, Ho, Er, Tm, and Yb; and a, b, c, and d each represent a moles. The dielectric ceramic composition satisfying the requirements of $0.03 \leq x \leq 0.20$, $0.99 \leq m \leq 1.03$, $0.10 \leq a \leq 5.0$, $0.025 \leq b \leq 2.5$, $0.20 \leq c \leq 8.0$, and $2.5 \leq d < 3.5$. Dielectric ceramic layers in a monolithic ceramic capacitor are formed of a sintered body of the dielectric ceramic composition.

20 Claims, 1 Drawing Sheet

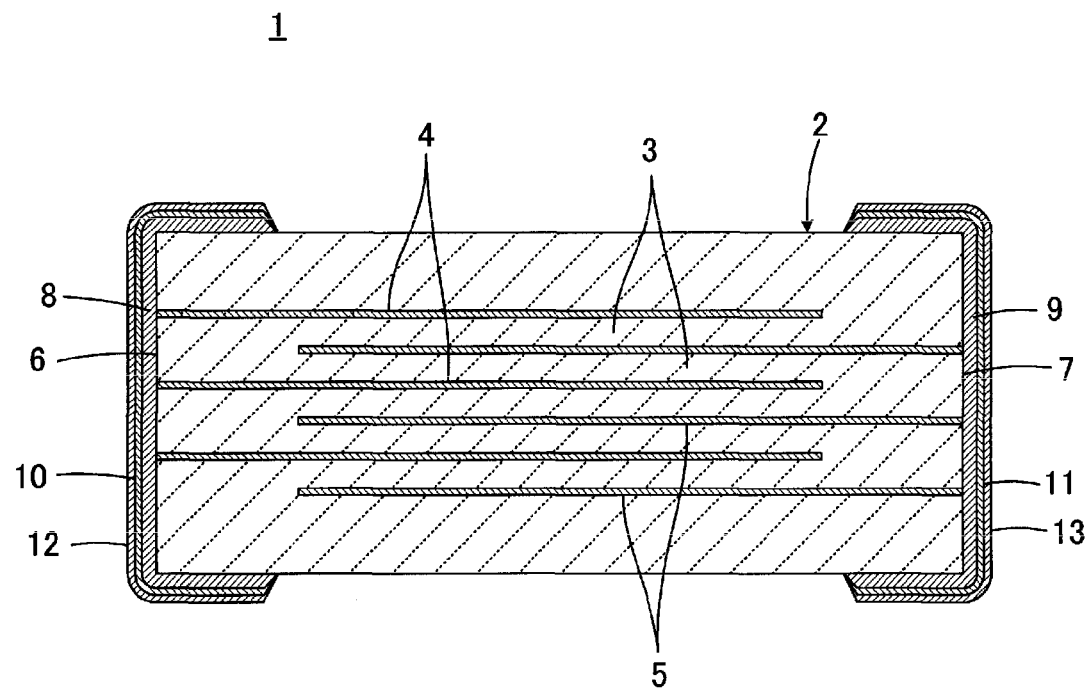

DIELECTRIC CERAMIC COMPOSITION AND MONOLITHIC CERAMIC CAPACITOR

This is a continuation of application Ser. No. PCT/JP2009/066089, filed Sep. 15, 2009, which is incorporated in its entirety herein by reference.

TECHNICAL FIELD

The present invention relates to dielectric ceramic compositions and monolithic ceramic capacitors, and in particular, to a dielectric ceramic composition suitable for, for example, a car-mounted monolithic ceramic capacitor used in a high-temperature environment, and a monolithic ceramic capacitor formed using the dielectric ceramic composition.

BACKGROUND ART

In order that a base metal, such as Ni or a Ni alloy, can be used as a conductive material constituting internal electrodes for a monolithic ceramic capacitor, the dielectric ceramic composition constituting dielectric ceramic layers is required not to be converted into a semiconductor even when fired at a low oxygen partial pressure. Furthermore, the dielectric ceramic composition is required to have the characteristic of a flat relative dielectric constant with respect to temperature. Various dielectric ceramic compositions that can satisfy the requirements have been reported.

A dielectric ceramic composition of interest to the present invention is described in, for example, Japanese Unexamined Patent Application Publication No. 2005-194138 (Patent Document 1). Patent Document 1 discloses a dielectric ceramic composition represented by a composition formula: $100(Ba_{1-x}Ca_x)_mTiO_3+aMnO+bV_2O_5+cSiO_2+dRe_2O_3$ (wherein Re represents at least one metal element selected from Y, La, Sm, Eu, Gd, Tb, Dy, Ho, Er, Tm, and Yb; and a, b, c, and d each represent moles), the dielectric ceramic composition satisfying the requirements:
$0.030 \leq x \leq 0.20$,
$0.990 \leq m \leq 1.030$,
$0.010 \leq a \leq 5.0$,
$0.050 \leq b \leq 2.5$,
$0.20 \leq c \leq 8.0$, and
$0.050 \leq d \leq 2.5$.

Monolithic ceramic capacitors are used in, for example, car-mounted products in addition to other common consumer products. The properties required for monolithic ceramic capacitors for use in common consumer products are not necessarily the same as those in car-mounted products.

For example, common consumer products are required to satisfy X7R characteristics specified by the EIA standard (the rate of change of the dielectric constant with temperature is within the range of ±15% in the temperature range of −55° C. to 125° C. with reference to 25° C.) with respect to electrostatic capacity temperature characteristics. Car-mounted products are required to satisfy X8R characteristics specified by the EIA (the rate of change of the dielectric constant with temperature is within the range of ±15% in the temperature range of −55° C. to 150° C. with reference to 25° C.).

With respect to reliability as measured in a high-temperature loading test, common consumer products are evaluated at 150° C. Car-mounted products are evaluated at 175° C. Note that the load voltage used is determined depending on the intended applications of products including monolithic ceramic capacitors in such testing.

The dielectric ceramic composition described in Patent Document 1 is not necessarily suited to constitute dielectric ceramic layers in car-mounted monolithic ceramic capacitors.

That is, the dielectric ceramic composition described in Patent Document 1 has high reliability, i.e., a mean time to failure of 100 hours or more, in the high-temperature loading test in which a direct-current voltage is applied at 150° C. so as to produce a field strength of 10 V/μm. However, Patent Document 1 does not consider the reliability of the dielectric ceramic composition in a high-temperature loading test in which a direct-current voltage is applied at 175° C. so as to produce a field strength of 50 V/μm.

In the case where the Re content is increased the dielectric ceramic composition described in Patent Document 1, in order to improve reliability, the rate of change of the relative dielectric constant with temperature is degraded. It is thus impossible to achieve a balance between high reliability and a low rate of change of the relative dielectric constant with temperature.

Furthermore, it was found that although the rate of change of the relative dielectric constant with temperature satisfied an absolute value of 15% or less in the range of −55° C. to 125° C. for the dielectric ceramic composition described in Patent Document 1, the rate of change of the relative dielectric constant with temperature did not satisfy an absolute value of 15% or less in the range of −55° C. to 150° C.

Patent Document 1 is Japanese Unexamined Patent Application Publication No. 2005-194138

Problems to be Solved by the Invention

It is an object of the present invention to provide a dielectric ceramic composition that overcomes the foregoing problems, i.e., a dielectric ceramic composition suitable for, for example, a car-mounted monolithic ceramic capacitor used in a high-temperature environment.

It is another object of the present invention to provide a monolithic ceramic capacitor using the dielectric ceramic composition.

Means for Solving the Problems

To solve the foregoing technical problems, a dielectric ceramic composition according to the present invention is represented by a composition formula: $100(Ba_{1-x}Ca_x)_mTiO_3+aMgO+bV_2O_5+cSiO_2+dR_2O_3$ in which R represents at least one metal element selected from Y, La, Sm, Eu, Gd, Tb, Dy, Ho, Er, Tm, and Yb; and a, b, c, and d each represent moles, the dielectric ceramic composition satisfying the requirements:
$0.03 \leq x \leq 0.20$,
$0.99 \leq m \leq 1.03$,
$0.10 \leq a \leq 5.0$,
$0.025 \leq b \leq 2.5$,
$0.20 \leq c \leq 8.0$, and
$2.5 \leq d < 3.5$.

Preferably, the dielectric ceramic composition according to the present invention further contains 0.005 to 5.0 parts by mole of MnO with respect to 100 parts by mole of the composed represented by $(Ba_{1-x}Ca_x)_mTiO_3$.

The present invention is also directed to a monolithic ceramic capacitor that includes a capacitor body having a plurality of stacked dielectric ceramic layers and a plurality of internal electrodes arranged along specific interfaces between the dielectric ceramic layers; and a plurality of outer electrodes arranged different positions on the outer surfaces of the capacitor body and electrically connected to specific internal electrodes. The monolithic ceramic capacitor according to the present invention is characterized in that the dielectric ceramic layers are formed of a sintered body of the foregoing dielectric ceramic composition.

In the monolithic ceramic capacitor according to the present invention, preferably, the conductive material contained in the internal electrodes mainly contains at least one selected from Ni, Ni alloys, Cu, and Cu alloys.

Advantages

Since the dielectric ceramic composition according to the present invention contains Mg, the reliability at high temperatures increases with increasing R content, and the ratio of change of the relative dielectric constant with temperature is reduced at a temperature of 150° C. or lower.

More specifically, it is possible to produce a dielectric ceramic composition according to the present invention, having a relative dielectric constant of 1500 or more; flat temperature characteristics of the relative dielectric constant such that X8R characteristics specified by the EIA standard are satisfied; an insulation resistance as high as $10^{11}$ Ω·m or more, in terms of resistivity, at 25° C.; and high reliability in a high-temperature loading test, i.e., a mean time to failure of 200 hours or more when a direct-current voltage is applied at 175° C. so as to produce a field strength of 50 V/μm.

Thus, the use of the dielectric ceramic composition according to the present invention for the monolithic ceramic capacitor enables the monolithic ceramic capacitor to have excellent reliability under high-temperature loading even under severer working conditions due to higher performance and higher packing densities of electronic devices. Thereby, the monolithic ceramic capacitor is suitably used for vehicles.

Furthermore, the dielectric ceramic composition according to the present invention is not formed into a semiconductor even by firing at a low oxygen partial pressure. Consequently, a conductive material mainly containing at least one base metal selected from Ni, Ni alloys, Cu, and Cu alloys is advantageously used as the conductive material contained in internal electrodes of a monolithic ceramic capacitor.

The incorporation of Mn into the dielectric ceramic composition according to the present invention results in higher reliability.

BRIEF DESCRIPTION OF DRAWING

FIG. 1 is a schematic cross-sectional view of a monolithic ceramic capacitor 1 using a dielectric ceramic composition according to the present invention.

The monolithic ceramic capacitor 1 includes a capacitor body 2. The capacitor body 2 includes a plurality of stacked dielectric ceramic layers 3 and a plurality of internal electrodes 4 and 5 arranged along specific plural interfaces between adjacent dielectric ceramic layers 3. The internal electrodes 4 and 5 extend to outer surfaces of the capacitor body 2. The internal electrodes 4 extend to one end face 6 of the capacitor body 2 and the internal electrodes 5 extend to the other end face 7, and are alternately arranged in the capacitor body 2.

Outer electrodes 8 and 9 are arranged on the end faces 6 and 7 and the outer surfaces of the capacitor body 2. Furthermore, first plating layers 10 and 11 composed of, for example, Ni or Cu, are arranged on the outer electrodes 8 and 9, respectively, as needed. Second plating layers 12 and 13 composed of, for example, solder or Sn are arranged thereon.

A method for producing the monolithic ceramic capacitor 1 will be described below in the sequence of production steps.

Raw-material powders used for the dielectric ceramic composition are prepared and formed into a slurry. The slurry is formed into a sheet-like shape, thereby providing green sheets to be formed into the dielectric ceramic layers 3. Here, raw-material powders for the dielectric ceramic composition according to the present invention are used as the dielectric ceramic raw-material powders, as described below in detail.

Next, the internal electrodes 4 and 5 are formed on a surface of each of specific green sheets. A conductive material contained in the internal electrodes 4 and 5 mainly contains at least one selected from Ni, Ni alloys, Cu, and Cu alloys. In particular, the conductive material preferably contains Ni or a Ni alloy serving as a main component. The internal electrodes 4 and 5 are usually formed by screen printing or a transfer method with a conductive paste containing a conductive material as described above. However, the internal electrodes 4 and 5 may be formed by any method without limitation.

The required number of the green sheets, each being provided with internal electrode 4 or 5, for the dielectric ceramic layers 3 is stacked. These green sheets are interposed between the appropriate number of green sheets. The resulting stack is subjected to thermocompression bonding, thereby providing green capacitor body.

The resulting green capacitor body is then fired in a predetermined reducing atmosphere at a predetermined temperature, thereby forming the capacitor body 2 as illustrated in FIG. 1.

The outer electrodes 8 and 9 are formed on the end faces 6 and 7 of the capacitor body 2 so as to be electrically connected to the internal electrodes 4 and 5, respectively. Examples of a material that can be used for the outer electrodes 8 and 9 include Ni, Ni alloys, Cu, Cu alloys, Ag, and Ag alloys. The outer electrodes 8 and 9 are usually formed by applying a conductive paste, which is formed by adding a glass frit to a metal powder, onto the end faces 6 and 7 of the capacitor body 2 and baking the conductive paste.

Usually, the conductive paste to be formed into the outer electrodes 8 and 9 is applied onto the sintered capacitor body 2 and baked as described above. Alternatively, the conductive paste may be applied onto a green capacitor body before firing and baked simultaneously with the firing for forming the capacitor body 2.

Next, the outer electrodes 8 and 9 are subjected to, for example, Ni or Cu plating, thereby forming the first plating layers 10 and 11. Finally, the first plating layers 10 and 11 are subjected to, for example, solder or Sn plating to form the second plating layers 12 and 13, thereby completing the monolithic ceramic capacitor 1.

In the monolithic ceramic capacitor 1, the dielectric ceramic layers 3 are formed of a sintered body of the dielectric ceramic composition represented by the composition formula: $100(Ba_{1-x}Ca_x)_mTiO_3 + aMgO + bV_2O_5 + cSiO_2 + dR_2O_3$ where R represents at least one metal element selected from Y, La, Sm, Eu, Gd, Tb, Dy, Ho, Er, Tm, and Yb; and a, b, c, and d each represent moles.

In the composition formula, x, m, a, b, c, and d satisfy the following requirements:
$0.03 \leq x \leq 0.20$,
$0.99 \leq m \leq 1.03$,
$0.10 \leq a \leq 5.0$,
$0.025 \leq b \leq 2.5$,
$0.20 \leq c \leq 8.0$, and
$2.5 \leq d < 3.5$.

The dielectric ceramic composition can be sintered without being formed into a semiconductor even when the dielectric ceramic composition is fired at a low oxygen partial pressure, for example, in a reducing atmosphere.

In the case where the dielectric ceramic layers 3 in the monolithic ceramic capacitor 1 are formed using the dielectric ceramic composition, it is possible to obtain a relative dielectric constant of 1500 or more; flat temperature characteristics of the relative dielectric constant such that X8R characteristics specified by the EIA standard are satisfied; an insulation resistance as high as $10^{11}$ Ω·m or more, in terms of resistivity, at 25° C.; and high reliability in a high-temperature loading test, i.e., a mean time to failure of 100 hours or more when a direct-current voltage is applied at 175° C. so as to produce a field strength of 50 V/μm.

Starting materials of the dielectric ceramic composition contain a compound represented by $(Ba_{1-x}Ca_x)_mTiO_3$, a Mg compound, a V compound, a Si compound, and an R compound (wherein R represents at least one metal element selected from Y, La, Sm, Eu, Gd, Tb, Dy, Ho, Er, Tm, and Yb). With respect to a method for producing a raw-material powder of the dielectric ceramic composition, any method may be employed so long as the compound represented by $(Ba_{1-x}Ca_x)_mTiO_3$ is formed.

For example, where the compound represented by $(Ba_{1-x}Ca_x)_mTiO_3$ is referred to as a main component and other components are referred to as auxiliary components, the raw-material powder of the main component may be made by a production method including a step of mixing $BaCO_3$, $CaCO_3$, and $TiO_2$, a step of heat-treating the resulting mixture to synthesize the main component, and a step of mixing the auxiliary components with the resulting main component.

Alternatively, the raw-material powder of the dielectric ceramic composition may also be made by a production method including a step of synthesizing the main component using a wet synthetic process, e.g., hydrothermal synthesis, hydrolysis, or a sol-gel method, and a step of mixing the auxiliary components with the resulting main component.

The Mg compound, the V compound, the Si compound, and the R compound, which are the auxiliary components, are not limited to oxides but may be solutions of alkoxides or organometallic compounds so long as the dielectric ceramic composition is formed. The characteristics of the resulting dielectric ceramic composition are not impaired by forms of the auxiliary components.

The foregoing dielectric ceramic composition is fired to form the dielectric ceramic layers 3 in the monolithic ceramic capacitor 1 as illustrated in FIG. 1. Metal, for example, Ni, an Ni alloy, Cu, or a Cu alloy, contained in the internal electrodes 4 and 5 diffuses in the dielectric ceramic layers 3 during the firing step, in some cases. For the foregoing dielectric ceramic composition, it is found that even if the metal component diffuses, the electrical characteristics of the dielectric ceramic composition are substantially unaffected.

The present invention will be more specifically described below with reference to an experimental example. The experimental example is also to explain the basis for the described limitations on the composition range of the dielectric ceramic composition according to the present invention.

In this experimental example, monolithic ceramic capacitors as illustrated in FIG. 1 were produced as samples.

First, high-purity $BaCO_3$, $CaCO_3$, and $TiO_2$ powders were prepared as starting materials for a main component $(Ba_{1-x}Ca_x)_mTiO_3$. These starting materials were mixed in such a manner that the Ca contents, i.e., "amounts of Ca: x" and "(Ba, Ca)/Ti ratios: m", illustrated in Table 1 were achieved. Each of the mixed starting-material powders was wet-mixed with a ball mill to form a uniform dispersion. The resulting mixtures were dried to give mixed powders.

The resulting mixed powders were calcined at 1000° C. to 1200° C. to provide main component powders having an average particle size of 0.20 μm and the x and m values in Table 1. Note that the average particle size was determined by observing the powders with a scanning electron microscope and measuring the particle sizes of 300 particles.

$MgCO_3$, $V_2O_5$, $SiO_2$, and $R_2O_3$ (wherein R represents Y, La, Sm, Eu, Gd, Tb, Dy, Ho, Er, Tm, or Yb) powders were prepared as starting materials for auxiliary components. The starting material powders for the auxiliary components were mixed with the foregoing main component powder so as to satisfy x, m, a, b, c, and d of the composition represented by the composition formula $100(Ba_{1-x}Ca_x)_mTiO_3 + aMgO + bV_2O_5 + cSiO_2 + dR_2O_3$, set forth in Table 1.

TABLE 1

| Sample | 100 $(Ba_{1-x}Ca_x)_mTiO_3 + aMgO + bV_2O_5 + cSiO_2 + dR_2O_3$ | | | | | | | MnO part by mole |
|---|---|---|---|---|---|---|---|---|
| | x | m | a | b | c | R | d | |
| 1* | 0.02 | 1.01 | 2 | 0.25 | 2 | Y | 3 | 0 |
| 2* | 0.21 | 1.01 | 2 | 0.25 | 2 | Y | 3 | 0 |
| 3* | 0.1 | 0.988 | 2 | 0.25 | 2 | Y | 3 | 0 |
| 4* | 0.1 | 1.035 | 2 | 0.25 | 2 | Y | 3 | 0 |
| 5* | 0.1 | 1.01 | 0.09 | 0.25 | 2 | Y | 3 | 0 |
| 6* | 0.1 | 1.01 | 5.1 | 0.25 | 2 | Y | 3 | 0 |
| 7* | 0.1 | 1.01 | 2 | 0.024 | 2 | Y | 3 | 0 |
| 8* | 0.1 | 1.01 | 2 | 2.7 | 2 | Y | 3 | 0 |
| 9* | 0.1 | 1.01 | 2 | 0.25 | 0.18 | Y | 3 | 0 |
| 10* | 0.1 | 1.01 | 2 | 0.25 | 8.2 | Y | 3 | 0 |
| 11* | 0.1 | 1.01 | 2 | 0.25 | 2 | Y | 2.4 | 0 |
| 12* | 0.1 | 1.01 | 2 | 0.25 | 2 | Y | 3.5 | 0 |
| 13 | 0.03 | 1.01 | 2 | 0.25 | 2 | Y | 3 | 0 |
| 14 | 0.2 | 1.01 | 2 | 0.25 | 2 | Y | 3 | 0 |
| 15 | 0.1 | 0.99 | 2 | 0.25 | 2 | Y | 3 | 0 |
| 16 | 0.1 | 1.03 | 2 | 0.25 | 2 | Y | 3 | 0 |
| 17 | 0.1 | 1.01 | 0.1 | 0.25 | 2 | Y | 3 | 0 |
| 18 | 0.1 | 1.01 | 5 | 0.25 | 2 | Y | 3 | 0 |
| 19 | 0.1 | 1.01 | 2 | 0.025 | 2 | Y | 3 | 0 |
| 20 | 0.1 | 1.01 | 2 | 2.5 | 2 | Y | 3 | 0 |
| 21 | 0.1 | 1.01 | 2 | 0.25 | 0.2 | Y | 3 | 0 |
| 22 | 0.1 | 1.01 | 2 | 0.25 | 8 | Y | 3 | 0 |
| 23 | 0.1 | 1.01 | 2 | 0.25 | 2 | Y | 2.5 | 0 |
| 24 | 0.1 | 1.01 | 2 | 0.25 | 2 | Y | 3.4 | 0 |
| 25 | 0.1 | 1.01 | 2 | 0.25 | 2 | La | 3 | 0 |
| 26 | 0.1 | 1.01 | 2 | 0.25 | 2 | Sm | 3 | 0 |
| 27 | 0.1 | 1.01 | 2 | 0.25 | 2 | Eu | 3 | 0 |
| 28 | 0.1 | 1.01 | 2 | 0.25 | 2 | Gd | 3 | 0 |
| 29 | 0.1 | 1.01 | 2 | 0.25 | 2 | Tb | 3 | 0 |
| 30 | 0.1 | 1.01 | 2 | 0.25 | 2 | Dy | 3 | 0 |
| 31 | 0.1 | 1.01 | 2 | 0.25 | 2 | Ho | 3 | 0 |
| 32 | 0.1 | 1.01 | 2 | 0.25 | 2 | Er | 3 | 0 |
| 33 | 0.1 | 1.01 | 2 | 0.25 | 2 | Tm | 3 | 0 |
| 34 | 0.1 | 1.01 | 2 | 0.25 | 2 | Yb | 3 | 0 |
| 35 | 0.1 | 1.01 | 2 | 0.25 | 2 | Y | 3 | 0.004 |
| 36 | 0.1 | 1.01 | 2 | 0.25 | 2 | Y | 3 | 5.1 |
| 37 | 0.1 | 1.01 | 2 | 0.25 | 2 | Y | 3 | 0.005 |
| 38 | 0.1 | 1.01 | 2 | 0.25 | 2 | Y | 3 | 5 |
| 39 | 0.03 | 1.01 | 2 | 0.25 | 2 | Y | 3 | 0.5 |
| 40 | 0.2 | 1.01 | 2 | 0.25 | 2 | Y | 3 | 0.5 |
| 41 | 0.1 | 0.99 | 2 | 0.25 | 2 | Y | 3 | 0.5 |
| 42 | 0.1 | 1.03 | 2 | 0.25 | 2 | Y | 3 | 0.5 |
| 43 | 0.1 | 1.01 | 0.1 | 0.25 | 2 | Y | 3 | 0.5 |
| 44 | 0.1 | 1.01 | 5 | 0.25 | 2 | Y | 3 | 0.5 |
| 45 | 0.1 | 1.01 | 2 | 0.05 | 2 | Y | 3 | 0.5 |
| 46 | 0.1 | 1.01 | 2 | 2.5 | 2 | Y | 3 | 0.5 |
| 47 | 0.1 | 1.01 | 2 | 0.25 | 0.2 | Y | 3 | 0.5 |
| 48 | 0.1 | 1.01 | 2 | 0.25 | 8 | Y | 3 | 0.5 |
| 49 | 0.1 | 1.01 | 2 | 0.25 | 2 | Y | 2.5 | 0.5 |
| 50 | 0.1 | 1.01 | 2 | 0.25 | 2 | Y | 3.4 | 0.5 |

Each of the resulting mixed powders was wet-mixed with a ball mill to form a uniform dispersion. The resulting mixtures were dried to give a raw-material powder of the dielectric ceramic composition.

Next, a polyvinyl butyral-based binder, a plasticizer, and an organic solvent, such as ethanol, were added to each resulting dielectric ceramic raw-material powder. The resulting mixture was wet-mixed to form a slurry containing the corresponding dielectric ceramic composition.

Each slurry was formed into a sheet-like shape on a carrier film composed of polyethylene terephthalate, thereby providing green sheets containing the corresponding dielectric ceramic composition. The resulting green sheets had a thickness of 1.4 µm.

Internal electrode patterns were formed by printing on the green sheets using a conductive paste mainly containing Ni. Then six such green sheets were stacked so as to face each other and provide a plurality of electrostatic capacities. Furthermore, an appropriate number of ceramic green sheets not including an internal electrode pattern were stacked on the upper and lower surfaces. The resulting stack was subjected to thermocompression bonding to form a green capacitor body.

The resulting green capacitor bodies were maintained in a $N_2$ atmosphere at 350° C. for 3 hours to perform debinding. Then the debinded capacitor bodies were fired in a reducing atmosphere having an oxygen partial pressure of $10^{-12}$ to $10^{-9}$ MPa, which does not cause oxidation of Ni contained in the internal electrodes, using a $N_2$—$H_2$—$H_2O$ mixed gas at temperatures shown in Table 2 for 2 hours, thereby providing sintered capacitor bodies.

Next, a conductive paste containing Ag as a main component and a $B_2O_3$—$SiO_2$—BaO-based glass frit was applied on both end faces of each of the resulting capacitor bodies and baked in a $N_2$ atmosphere at 600° C., thereby forming outer electrodes electrically connected to the internal electrodes.

Ni plating was performed on the outer electrodes by a known method to form first plating layers. Sn plating was performed thereon to form second plating layers.

The outer dimensions of each of the resulting monolithic ceramic capacitor samples were 5.0 mm wide, 5.7 mm long, and 2.4 mm thick. The number of effective dielectric ceramic layers was 5. The area of electrodes facing each other was 16.3 mm² per layer. Each dielectric ceramic layer had a thickness of 1.0 µm.

The electrostatic capacity (C) and dielectric loss (tan δ) of each of the resulting monolithic ceramic capacitor samples were measured with an automatic bridge measurement by application of an alternating voltage of 1 Vrms at 1 kHz at 25° C. The relative dielectric constant ($\epsilon_r$) was calculated on the basis of the resulting C, the area of the internal electrodes, and the thickness of each dielectric ceramic layer.

The electrostatic capacity was measured at different temperatures within the range of −55° C. to 150° C. The electrostatic capacity when the maximum absolute value of a change in capacity was obtained with reference to the electrostatic capacity ($C_{25}$) at 25° C. was defined as a electrostatic capacity ($C_{TC}$). The rate of change of the electrostatic capacity with temperature ($\Delta C_{TC}$) when the electrostatic capacity ($C_{TC}$) was obtained was calculated on the basis of the formula: $\Delta C_{TC} = \{(C_{TC} - C_{25})/C_{25}\}$.

The insulation resistance (IR) was measured with an insulation resistance tester by application of a direct-current voltage of 25 V for 120 seconds at 25° C. The resistivity (ρ) was calculated on the basis of the resulting IR and the structure of the monolithic ceramic capacitor.

With respect to the high-temperature loading reliability test, the change in insulation resistance with time was measured while a direct-current voltage of 100 V was applied at 175° C. When the insulation resistance of each sample reached $10^5 \Omega$ or less, this point of time was regarded as a fault. The mean time to failure (MTTF) of each sample was determined.

Table 2 illustrates the evaluation results of the foregoing electrical properties.

TABLE 2

| Sample | Firing temperature (° C.) | ∈r | tanδ (%) | $\Delta C_{TC}$ (%) | logρ (ρ/Ω·m) | MTTF (hour) |
|---|---|---|---|---|---|---|
| 1* | 1250 | 1540 | 1.2 | −15.2 | 11.4 | 180 |
| 2* | 1250 | 1420 | 8.5 | −10.3 | 11.6 | 175 |
| 3* | 1250 | 1660 | 7 | −13.9 | 10.8 | 120 |
| 4* | 1250 | 1330 | 1 | −10.1 | 10.7 | 220 |
| 5* | 1225 | 1590 | 6.2 | −18.4 | 10.8 | 225 |
| 6* | 1275 | 1570 | 6.8 | −14 | 10.7 | 188 |
| 7* | 1250 | 1630 | 7.1 | −16.2 | 12 | 176 |
| 8* | 1250 | 1460 | 4.3 | −16.2 | 10.6 | 290 |
| 9* | 1300 | 1380 | 2.1 | −10.3 | 10.6 | 150 |
| 10* | 1200 | 1600 | 6.8 | −16.6 | 10.8 | 230 |
| 11* | 1250 | 1720 | 7.1 | −17.9 | 11.9 | 190 |
| 12* | 1250 | 1470 | 6.6 | −13.7 | 10.7 | 185 |
| 13 | 1250 | 1530 | 1.2 | −14.8 | 11.4 | 210 |
| 14 | 1250 | 1510 | 7.4 | −11 | 11.7 | 205 |
| 15 | 1250 | 1670 | 7 | −13.8 | 11.1 | 215 |
| 16 | 1250 | 1510 | 2.4 | −12.5 | 11.2 | 205 |
| 17 | 1225 | 1560 | 6.3 | −14.5 | 11.1 | 230 |
| 18 | 1275 | 1590 | 6.7 | −14 | 11.2 | 210 |
| 19 | 1250 | 1630 | 7.2 | −14.8 | 12.1 | 205 |
| 20 | 1250 | 1520 | 5.3 | −14.7 | 11.1 | 280 |
| 21 | 1300 | 1510 | 5 | −10.2 | 11.2 | 210 |
| 22 | 1200 | 1610 | 6.9 | −14.8 | 11.3 | 270 |
| 23 | 1250 | 1720 | 7.2 | −14.7 | 12 | 215 |
| 24 | 1250 | 1510 | 5.4 | −13.5 | 11.1 | 205 |
| 25 | 1250 | 1620 | 5.3 | −12.5 | 11.8 | 250 |
| 26 | 1200 | 1610 | 5.3 | −13 | 11.7 | 270 |
| 27 | 1200 | 1620 | 5.2 | −12.8 | 11.8 | 280 |
| 28 | 1200 | 1610 | 5.2 | −13.2 | 11.7 | 270 |
| 29 | 1200 | 1590 | 5.1 | −13.3 | 11.6 | 260 |
| 30 | 1225 | 1590 | 5.1 | −12.4 | 11.3 | 250 |
| 31 | 1250 | 1610 | 5.2 | −12.2 | 11.8 | 260 |
| 32 | 1275 | 1580 | 5.1 | −12.5 | 11.7 | 240 |
| 33 | 1275 | 1570 | 5 | −12.7 | 11.6 | 235 |
| 34 | 1275 | 1570 | 5 | −13 | 11.5 | 250 |
| 35 | 1250 | 1620 | 5.3 | −12.5 | 11.8 | 285 |
| 36 | 1225 | 1580 | 4.8 | −10.7 | 11.3 | 290 |
| 37 | 1250 | 1620 | 5.2 | −12.4 | 11.7 | 305 |
| 38 | 1225 | 1570 | 4.7 | −11.6 | 11.2 | 315 |
| 39 | 1250 | 1540 | 1.3 | −13.7 | 11.3 | 320 |
| 40 | 1250 | 1520 | 7.2 | −10.2 | 11.8 | 315 |
| 41 | 1250 | 1650 | 7.3 | −12.9 | 11.2 | 310 |
| 42 | 1250 | 1520 | 2.5 | −11.4 | 11.3 | 310 |
| 43 | 1225 | 1540 | 6.1 | −13.6 | 11.2 | 330 |
| 44 | 1275 | 1550 | 6.6 | −13.8 | 11.3 | 315 |
| 45 | 1250 | 1620 | 7.1 | −13.5 | 12 | 310 |
| 46 | 1250 | 1530 | 5.2 | −13.4 | 11.3 | 360 |
| 47 | 1300 | 1520 | 5.9 | −11 | 11.4 | 305 |
| 48 | 1200 | 1610 | 6.8 | −13.2 | 11.4 | 350 |
| 49 | 1250 | 1700 | 7.3 | −14.7 | 12 | 320 |
| 50 | 1250 | 1530 | 5.2 | −13.8 | 11 | 315 |

Preferred ranges of the electrical properties illustrated in Table 2 are as follows: $\epsilon_r$ is 1500 or more; tan δ is 7.5% or less; $\Delta C_{TC}$ is 15% or less in absolute value; with respect to ρ, log ρ (unit of ρ: Ω·m) is 11 or more; and MTTF is 200 hours or more.

In Tables 1 and 2, the sample numbers marked with asterisks indicate that the samples were outside the composition range of the present invention.

The reason the composition range is limited to that described above in the present invention will be described below.

When x<0.03, as indicated by sample 1, the absolute value of $\Delta C_{TC}$ exceeds 15%, and MTTF is less than 200 hours. When x>0.20, as indicated by sample 2, $\epsilon_r$ is less than 1500, tan δ exceeds 7.5%, and MTTF is less than 200 hours.

When m<0.99, as indicated by sample 3, log ρ is less than 11, and MTTF is significantly reduced. When m>1.03, as indicated by sample 4, $\in_r$ is less than 1500, and log ρ is less than 11.

When a<0.10, as indicated by sample 5, log ρ is less than 11, and the absolute value of $\Delta C_{TC}$ is 15% or less. When a>5.0, as indicated by sample 6, log ρ is less than 11, and MTTF is less than 200 hours.

When b<0.025, as indicated by sample 7, the absolute value of $\Delta C_{TC}$ exceeds 15%, and MTTF is less than 200 hours. When b>2.5, as indicated by sample 8, $\in_r$ is less than 1500, and log ρ is less than 11.

When c<0.20, as indicated by sample 9, $\in_r$ is less than 1500, log ρ is less than 11, and MTTF is less than 200 hours. When c>8.0, as indicated by sample 10, the absolute value of $\Delta C_{TC}$ exceeds 15%, and log ρ is less than 11.

When d<2.5, as indicated by sample 11, the absolute value of $\Delta C_{TC}$ exceeds 15%, and MTTF is less than 200 hours. When d≧3.5, as indicated by sample 12, $\in_r$ is less than 1500, log ρ is less than 11, and MTTF is less than 200 hours.

In contrast, each of samples 13 to 50, which are within the scope of the present invention, has the following properties: $\in_r$ is as high as 1500 or more; tan δ is as low as 5% or less; the absolute value of $\Delta C_{TC}$ is as low as 15% or less; log ρ is as high as 11 or more; and MTTF is as long as 200 hours or more.

Furthermore, among these samples 13 to 50 within the scope of the present invention, each of samples 34 to 50 contain 0.005 to 5.0 parts by mole of MnO before sintering (and Mn after sintering) with respect to 100 parts by mole of the compound represented by $(Ba_{1-x}Ca_x)_m TiO_3$, and MTTF is further increased to 300 hours or more.

| | |
|---|---|
| 1 | monolithic ceramic capacitor |
| 2 | capacitor body |
| 3 | dielectric ceramic layer |
| 4, 5 | internal electrode |
| 8, 9 | outer electrode |

The invention claimed is:

1. A dielectric ceramic composition represented by the composition formula:

$$100(Ba_{1-x}Ca_x)_m TiO_3 + aMgO + bV_2O_5 + cSiO_2 + dR_2O_3$$

wherein R represents at least one metal element selected from the group consisting of Y, La, Sm, Eu, Gd, Tb, Dy, Ho, Er, Tm, and Yb; a, b, c, and d each represent moles, 0.03≦x≦0.20,
0.99≦m≦1.03,
0.10≦a≦5.0,
0.025≦b≦2.5,
0.20≦c≦8.0, and
2.5≦d<3.5.

2. The dielectric ceramic composition according to claim 1, further comprising 0.005 to 5.0 parts by mole of Mn with respect to 100 parts by mole of $(Ba_{1-x}Ca_x)_m TiO_3$.

3. A monolithic ceramic capacitor comprising a capacitor body having a plurality of stacked dielectric ceramic layers and a plurality of internal electrodes arranged at different interfaces between the dielectric ceramic layers, and at least two outer electrodes arranged different positions on the outer surfaces of the capacitor body and electrically connected to different internal electrodes,
wherein each of the dielectric ceramic layers is formed of a sintered body of the dielectric ceramic composition according to claim 2.

4. The monolithic ceramic capacitor according to claim 3, wherein a conductive material in the internal electrodes comprises at least one conductor selected from the group consisting of Ni, Ni alloys, Cu, and Cu alloys.

5. The dielectric ceramic composition according to claim 1, in which 0.1≦x, m≦1.01, 2≦a, 0.05≦b≦0.25, 2≦c, and 3≦d.

6. The dielectric ceramic composition according to claim 5, in which R comprises Y.

7. A monolithic ceramic capacitor comprising a capacitor body having a plurality of stacked dielectric ceramic layers and a plurality of internal electrodes arranged at different interfaces between the dielectric ceramic layers, and at least two outer electrodes arranged different positions on the outer surfaces of the capacitor body and electrically connected to different internal electrodes,
wherein each of the dielectric ceramic layers is formed of a sintered body of the dielectric ceramic composition according to claim 6.

8. The monolithic ceramic capacitor according to claim 7, wherein a conductive material in the internal electrodes comprises at least one conductor selected from the group consisting of Ni, Ni alloys, Cu, and Cu alloys.

9. A monolithic ceramic capacitor comprising a capacitor body having a plurality of stacked dielectric ceramic layers and a plurality of internal electrodes arranged at different interfaces between the dielectric ceramic layers, and at least two outer electrodes arranged different positions on the outer surfaces of the capacitor body and electrically connected to different internal electrodes,
wherein each of the dielectric ceramic layers is formed of a sintered body of the dielectric ceramic composition according to claim 5.

10. The monolithic ceramic capacitor according to claim 9, wherein a conductive material in the internal electrodes comprises at least one conductor selected from the group consisting of Ni, Ni alloys, Cu, and Cu alloys.

11. The dielectric ceramic composition according to claim 1, in which R comprises Y.

12. A monolithic ceramic capacitor comprising a capacitor body having a plurality of stacked dielectric ceramic layers and a plurality of internal electrodes arranged at different interfaces between the dielectric ceramic layers, and a at least two outer electrodes arranged different positions on the outer surfaces of the capacitor body and electrically connected to different internal electrodes,
wherein each of the dielectric ceramic layers is formed of a sintered body of the dielectric ceramic composition according to claim 11.

13. The monolithic ceramic capacitor according to claim 12, wherein a conductive material in the internal electrodes comprises at least one conductor selected from the group consisting of Ni, Ni alloys, Cu, and Cu alloys.

14. A monolithic ceramic capacitor comprising a capacitor body having a plurality of stacked dielectric ceramic layers and a plurality of internal electrodes arranged at different interfaces between the dielectric ceramic layers, and at least two outer electrodes arranged different positions on the outer surfaces of the capacitor body and electrically connected to different internal electrodes,
wherein each of the dielectric ceramic layers is formed of a sintered body of the dielectric ceramic composition according to claim 1.

15. The monolithic ceramic capacitor according to claim 14, wherein a conductive material in the internal electrodes comprises at least one conductor selected from the group consisting of Ni, Ni alloys, Cu, and Cu alloys.

16. A dielectric ceramic composition represented by the composition formula:

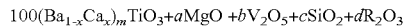
$$100(Ba_{1-x}Ca_x)_m TiO_3 + aMgO + bV_2O_5 + cSiO_2 + dR_2O_3$$

wherein R represents at least one metal element selected from the group consisting of Y, La, Sm, Eu, Gd, Tb, Dy, Ho, Er, Tm, and Yb; a, b, c, and d each represent moles, $0.03 \leq x \leq 0.20$,
$0.99 \leq m \leq 1.03$,
$0.10 \leq a \leq 5.0$,
$0.025 \leq b \leq 2.5$,
$0.20 \leq c \leq 8.0$, and
$2.5 \leq d < 3.5$, and containing an amount of Mn with respect to 100 parts by mole of $(Ba_{1-x}Ca_x)_m TiO_3$ of 0.5 parts by mole.

17. The dielectric ceramic composition according to claim 16, in which $0.1 \leq x$, $m \leq 1.01$, $2 \leq a$, $0.05 \leq b \leq 0.25$, $2 \leq c$, and $3 \leq d$.

18. A monolithic ceramic capacitor comprising a capacitor body having a plurality of stacked dielectric ceramic layers and a plurality of internal electrodes arranged at different interfaces between the dielectric ceramic layers, and at least two outer electrodes arranged different positions on the outer surfaces of the capacitor body and electrically connected to different internal electrodes, wherein each of the dielectric ceramic layers is formed of a sintered body of the dielectric ceramic composition according to claim 17.

19. The monolithic ceramic capacitor according to claim 18, wherein a conductive material in the internal electrodes comprises at least one conductor selected from the group consisting of Ni, Ni alloys, Cu, and Cu alloys.

20. The dielectric ceramic composition according to claim 16, in which R comprises Y.

* * * * *